(12) United States Patent
Faraboschi et al.

(10) Patent No.: US 11,119,941 B2
(45) Date of Patent: Sep. 14, 2021

(54) CAPABILITY ENFORCEMENT CONTROLLER

(71) Applicant: HEWLETT PACKARD ENTERPRISE DEVELOPMENT LP, Houston, TX (US)

(72) Inventors: Paolo Faraboschi, Sant Cugat del Valles (ES); Dejan S. Milojicic, Palo Alto, CA (US); Kirk M. Bresniker, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/799,153

(22) Filed: Oct. 31, 2017

(65) Prior Publication Data
US 2019/0129864 A1    May 2, 2019

(51) Int. Cl.
*G06F 12/14*      (2006.01)
*G06F 12/1027*    (2016.01)
*G06F 12/1009*    (2016.01)

(52) U.S. Cl.
CPC ........ *G06F 12/1027* (2013.01); *G06F 12/145* (2013.01); *G06F 12/1009* (2013.01); *G06F 2212/1052* (2013.01); *G06F 2212/65* (2013.01); *G06F 2212/68* (2013.01); *G06F 2221/2141* (2013.01)

(58) Field of Classification Search
CPC ............... G06F 12/145; G06F 12/1009; G06F 12/1027; G06F 12/1425; G06F 21/85; G06F 2212/1052; G06F 2212/65; G06F 2212/68
See application file for complete search history.

(56) References Cited

U.S. PATENT DOCUMENTS

| | | | | |
|---|---|---|---|---|
| 4,003,033 A | * | 1/1977 | O'Keefe | G06F 9/226 710/107 |
| 6,480,952 B2 | | 11/2002 | Gorishek et al. | |
| 6,532,530 B1 | | 3/2003 | Kim et al. | |
| 8,122,229 B2 | | 2/2012 | Wallach et al. | |
| 8,561,037 B2 | | 10/2013 | Wallach et al. | |
| 8,566,568 B2 | | 10/2013 | Michalak et al. | |
| 2005/0091439 A1 | * | 4/2005 | Mohideen | G06F 12/109 711/1 |

(Continued)

FOREIGN PATENT DOCUMENTS

WO    WO-2016202001    12/2016

OTHER PUBLICATIONS

"Capability-Based Computer Systems" by Henry M. Levy, published by Digital Press (Year: 1984).*

(Continued)

*Primary Examiner* — William E. Baughman
*Assistant Examiner* — Janice M. Girouard
(74) *Attorney, Agent, or Firm* — Sheppard Mullin Richter & Hampton LLP (57) ABSTRACT

According to examples, a system may include a central processing unit (CPU) and a capability enforcement controller in communication with the CPU. The capability enforcement controller may be separate from the CPU and may implement capability processing functions that control capabilities. Capabilities may be defined as unforgeable tokens of authority that protect access by the CPU to a physical address at which the data is stored in a memory.

20 Claims, 4 Drawing Sheets

(56) References Cited

U.S. PATENT DOCUMENTS

2017/0220483 A1* 8/2017 Lillibridge ............ G06F 12/023
2017/0329526 A1* 11/2017 Achermann .......... G06F 9/5016
2017/0371663 A1* 12/2017 Milojicic ............ G06F 9/30145

OTHER PUBLICATIONS

A Collection of papers on Cm*: a multimicroprocessor computer system by Samues H. Fuller, Carnegie Mellon University, (Year: 1977).*
"The Cambridge CAP Computerand Its Operating System" by M.V. Wilkes and R.M. Needham, University of Cambridge, Elsevier North Holland, Inc., Copyright 1979 by Elsevier North Holland, Inc. (Year: 1979).*
Baumann (The multikernel: a new OS architecture for scalable multicolored systems presented at SOSP '09 Proceedings of the ACM SIGOPS 22nd symposium on Operating System Principals, pp. 29-44, by Andrew Baumann, et al.. (Year: 2009).*
Computer Engineering: A DEC view of Hardware System Design, by C. Gordon BEll, et.el.. Also available online at http://www.bitsavers.org/pdf/dec/_Books/Bell-ComputerEngineering.pdf (Year: 1978).*
Memory-Side Protection With a Capability Enforcement Co-Processor by Leonid Azriel, et al. Includes a history of hardware assisted capability enforcement systems as of 2019. Published by ACM Transactions on Architecture and Code Optimization, vol. 16 No. 1, Article 5, publication date Mar. 2019. (Year: 2019).*
Technical Report No. 818, University of Cambridge Computer Laboratory, New approaches to operating system security extensibility, PHD by Robert N.M. Watson, Apr. 2012 (Year: 2012).*
Centre for Development of Advanced Computing, "Intel Xeon-phi Coprocessor Architecture—an Overview", Nov. 7, 2013, 4 pages. https://www.cdac.in/index.aspx?id=ev_hpc_hypack13-mode03-coprocessor-compiler-vect.
Robert N. M. 'Watson, et al., "Capability Hardware Enhanced RISC Instructions: CHERI Instruction-set architecture", Technical Report, No. 850, University of Cabridge, Computer Laboratory, Apr. 2014, pp. 131.
Robert Watson, "CHERI: Capability Hardware Enhanced RISC Instruction", CHERI Frequently Asked Questions (FAQ), University of Cambridge, Computer Laboratory, download date Oct. 1, 2017, pp. 3. https://www.cl.cam.ac.uk/research/security/ctsrd/cheri/cheri-faq.html.

* cited by examiner

FIG. 4

CAPABILITY ENFORCEMENT CONTROLLER

BACKGROUND

Memory technology has substantially improved over time. Currently, some servers and workstations afford TiBs of physical memory, while some rack-scale systems afford physical memory in the petabyte range. At these scales, organizing memory in KiB-sized pages may result in billions of pages being generated while the overhead to manage the mappings often fails to scale with that growth as page tables and page-table walks overflow translation lookaside buffers (TLBs) and caches. The relatively large amount of available memory has resulted in a shift towards larger, e.g., in the MiB scale or the GiB scale, page sizes such that applications may allocate most of their working set immediately. However, larger pages often increase security risks and increase exposure errors (or malicious attacks) because any address within a page may be accessed without additional fine-grain control on the access to the addresses.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are capability enforcement controllers, systems that include the capability enforcement controllers, and methods for implementing the capability enforcement controllers. Capabilities may be defined as unforgeable tokens of authority that protect access by a central processing unit (CPU) to the physical address at which data covered by a capability is stored in a memory. Particularly, capabilities may enable protection of the data at a very fine granularity, e.g., down to a single-byte memory location.

Generally speaking, the capability enforcement controllers disclosed herein are external and separate from a CPU that seeks to access the capability covered data. In addition, the capability enforcement controllers disclosed herein may enforce the capabilities covering the data. Thus, for instance, the CPU may not have direct access to the capability covered data, but instead, the CPU may send an instruction to a capability enforcement controller that controls access to the data to access the data. The capability enforcement controller may determine whether the CPU is authorized to access the data and may prevent the CPU from accessing the data based on a determination that the CPU is not authorized to access the data. However, based on a determination that the CPU is authorized to access the data, the capability enforcement controller may access the data and may execute a requested action on the data.

By virtue of the implementation of the capability enforcement controllers and methods disclosed herein, data stored in memories may be protected through use of capabilities. As discussed herein, a capability may protect access to the physical address at which the protected data is stored. In this regard, the capability enforcement controllers discussed herein may implement a fine-grain protection of data, which may decrease security risks and exposure to errors often associated with using larger page sizes.

In addition, the capability enforcement controllers may perform the capability processing functions and thus, a CPU may not need to be changed in order for the data to be protected using capabilities. That is, for instance, the capability-related functionality that a general purpose capability-agnostic CPU may not support may be propagated to a capability enforcement controller for execution of the capability-related functionality. In one regard, therefore, the use of capabilities may be adopted relatively faster than if the CPU were to be modified to execute the capability-related functionality because it may take many years for CPU architectures to be changed to execute the capability-related functionality. As such, for instance, use of the capability enforcement controllers disclosed herein, e.g., the use of capabilities to protect data, may be adopted in a relatively shorter period of time as compared with waiting for CPUs to be modified to implement capabilities.

Before continuing, it is noted that as used herein, the terms "includes" and "including" mean, but is not limited to, "includes" or "including" and "includes at least" or "including at least." The term "based on" means "based on" and "based at least in part on."

Figure 1A:
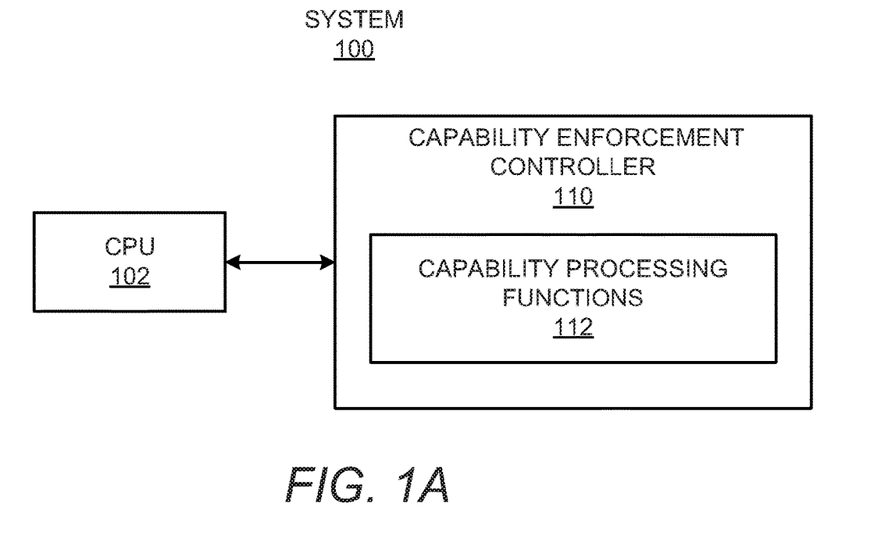
FIGS. 1A and 1B, respectively, show block diagrams of example systems that may include a capability enforcement controller to enforce capabilities covering physical addresses in a memory.
Figure 1B:
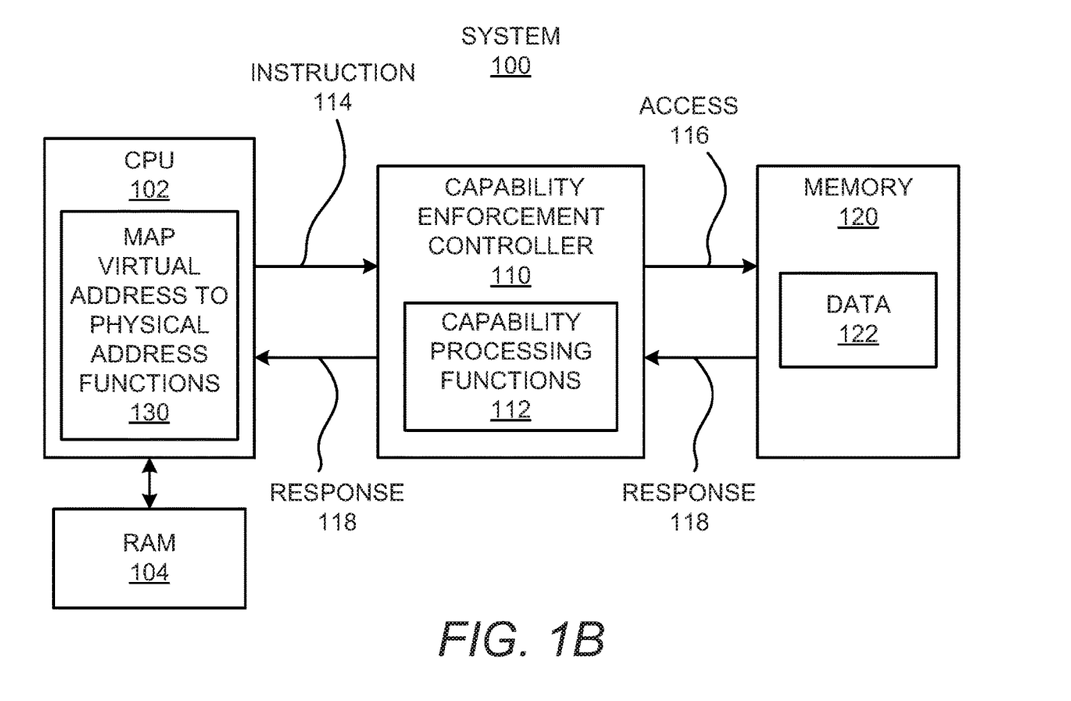

With reference first to FIGS. 1A and 1B, there are respectively shown block diagrams of example systems 100 that may include a capability enforcement controller to enforce capabilities covering physical addresses in a memory. The system 100 shown in FIG. 1B is depicted as including additional features as compared with the system 100 shown in FIG. 1A. It should be understood that the example systems 100 depicted in FIGS. 1A and 1B may include additional features and that some of the features described herein may be removed and/or modified without departing from the scopes of the systems 100.

As shown, the systems 100 may include a central processing unit (CPU) 102 and a capability enforcement controller 110. The CPU 102 may be electronic circuitry within a machine, such as a computer, a server, or the like, that carries out the instructions of a computer program. The CPU 102 may be a microprocessor and may be contained on an integrated circuit (IC) chip. In some examples, the CPU 102 may be a core on an integrated circuit chip. In addition, as shown in FIG. 1B, the CPU 102 may be in communication with a random access memory (RAM) 104, which may be a dynamic random access memory (DRAM), a static random access memory (SRAM), or the like.

As also shown in FIGS. 1A and 1B, the CPU 102 may be in communication with the capability enforcement controller 110. The communication may be made via a physical link, e.g., an interconnect, between the CPU 102 and the capability enforcement controller 110. In other examples, the CPU 102 may communicate with the capability enforcement controller 110 via a fabric. In any regard, the capability enforcement controller 110 may be a hardware accelerator interposed on a load/store path between the CPU 102 and a memory 120. For instance, the capability enforcement controller 110 may be a hardware controller, such as a central processing unit that is separate from the CPU 102. In other words, the capability enforcement controller 110 may be construed as an externally located co-processor to the CPU 102. In some examples, the CPU 102 and the capability enforcement controller 110 may be contained on a common IC chip, while in other examples, the CPU 102 and the capability enforcement controller 110 may be contained on separate IC chips, e.g., in separate devices.

The memory 120 may be an electronic, magnetic, optical, or other physical non-volatile storage device. The memory 120 may be a non-volatile random access memory (NVRAM). By way of particular example, the memory 120 may be a non-volatile dual in-line memory module (NVDIMM).

The capability enforcement controller 110 may implement capability processing functions 112 that control capabilities that protect access to physical locations, e.g., physical addresses, at which data 122 is stored in the memory 120. Capabilities may be defined as unforgeable tokens of authority that protect access by the CPU 102 to the physical address at which the data 122 is stored in the memory 120. Particularly, capabilities may enable protection of the data 122 at a very fine granularity, e.g., down to a single-byte memory location. The capability processing functions 112 may replace pointers to data 122 locations with capabilities, which are protected objects that may be created through the use of privileged instructions and may be executed by the capability enforcement controller 110 to do so. The capability enforcement controller 110 may thus control which processes may access which data 122 (e.g., objects) stored in the memory 120 without the need to use separate address spaces and therefore the processes may not require a context switch when an access occurs. In addition, the capability enforcement controller 110 may control capabilities that protect particular physical addresses, e.g., a particular address range, in the memory 120. Thus, for instance, and the capability enforcement controller 110 may implement capabilities to protect less than all of the physical addresses available in the memory 120.

In some examples, the capability enforcement controller 110 may implement the capability processing functions 112 as a sequence of machine readable instructions from a capability instruction set. In other examples, the capability enforcement controller 110 may implement the capability processing functions 112 by hardware logic blocks. In yet other examples, the capability enforcement controller 110 may implement the capability processing functions 112 by a combination of the sequence of machine readable instructions and the hardware logic blocks.

In some implementations, the capability enforcement controller 110 may implement the capability processing functions 112 through a direct programming of the capability enforcement controller 110 through memory mapped registers. In these implementations, the CPU 102 may perform out-of-band control of a memory side accelerator (MSA). This may include communication of <load, cap, addr, cr3> and <store, cap, addr, data, cr3>, in which cr3 may be a virtual address space pointer running on the CPU 102. In other implementations, the CPU 102 may decorate C++ objects with special instructions and may push that code out to the capability enforcement controller 110 using a memory interconnect or other connection. This may include communication of <load, cap> and <store, cap, data>.

In any regard, the capability enforcement controller 110 may implement the capability processing functions 112 by keeping extra information (hidden to the normal programming language), in addition to memory addresses stored in registers. The capability enforcement controller 110 may check the extra information upon every individual memory access to ensure the access is allowed. The check may also be extended to include the manipulation of capabilities, such as securely storing the capabilities to the memory 120 and retrieving the capabilities, while preventing access from unauthorized code. Capabilities may be passed in user space without incurring performance costs, but may result in hardware changes to the memory hierarchy, the microarchitecture (e.g., the register file and caches), and the instruction set architecture itself. The software stack may also be appropriately changed to maintain and utilize capabilities effectively, in describing data and code structures.

Generally speaking, the capability enforcement controller 110 may function as a secure memory controller, which takes the responsibility of guarding access to the memory 120 through a capability system. In this regard, the CPU 102 may use the capability enforcement controller 110 to access the data 122 stored in the memory 120 and/or to manipulate the capabilities stored in the capability enforcement controller 110. That is, instead of having direct access to capability protected data 122 stored in the memory 120, the CPU 102 may send an instruction 114 to the capability enforcement controller 110 to access the capability protected data 122. In response to receipt of the instruction 114, the capability enforcement controller 110 may implement the capability processing functions 112 to determine whether the requested data 122 is stored at a physical address that is protected by a capability. In some examples, the memory 120 may include a bit that indicates whether a particular location, e.g., physical address, in the memory 120 is a capability. In these examples, the capability enforcement controller 110 may determine that the physical address at which the requested data 122 is stored is protected by a capability if the requested data 122 is stored in a particular location in the memory 120 for which the bit has been set.

Based on a determination that the particular physical address at which the requested data 122 is stored is covered (e.g., protected) by a capability, the capability enforcement controller 110 may implement the capability processing functions 112 to determine whether the CPU 102 is permitted to access the requested data 122. In some examples, the capability enforcement controller 110 may store a capability register file that describes the rights of the CPU 102 or executing threads of the CPU 102, e.g., whether the executing threads are allowed to access the capability protected locations of the memory 120 or certain capability protected locations of the memory 120. In these examples, the capability enforcement controller 110 may access the capability register file to determine whether the executing thread of the CPU 102 that submitted the instruction 114 for the requested data 122 is permitted to access the location on the memory 120 at which the data 122 is stored.

The capability enforcement controller 110 may enforce capabilities on both data access and instruction execution (such as a procedure call, jump to a new instruction, or return from a procedure call). The data access supports passive data access and the instruction execution supports active objects and compartmentalization. The capability enforcement controller 110 may include instructions and/or logic blocks that store data 122 to the memory 120 or load data 122 from the memory 120 using capabilities. In addition, to prevent processes from forging capabilities, a bit may be maintained for each capability in the memory 120, which may be propagated through the cache hierarchy and TLB into the capability registers. In this regard, any attempt to modify a memory location containing capabilities by unauthorized code may clear the capability bit and effectively invalidate the capability, preventing access to the data. The tag not may not only enforce non-corruption, but may also ensure valid provenance, e.g., valid (dereferenceable) capabilities may be derived from other valid capabilities via valid manipulations.

Based on a determination that the CPU 102, e.g., an executing thread of the CPU 102, is not permitted to access the physical address of the memory 120 at which the data 122 is stored, the capability enforcement controller 110 may drop the request and/or may return an error signal to the CPU 102. However, based on a determination that the executing thread of the CPU 102 is permitted to access the location, e.g., the physical address, of the memory 120 at which the requested data 122 is stored, the capability enforcement controller 110 may access 116 the requested data 122. The access 116 to the data 122 may include performing an operation on the data as requested in the instruction 114. For instance, the capability enforcement controller 110 may retrieve the data 122, may erase the data 122, may modify the data 122, may replace the data 122, or the like. In addition, the capability enforcement controller 110 may determine that the requested action on the data 122 has been performed and may receive a response 118 from the memory 120 confirming that the action has been performed. The capability enforcement controller 110 may further forward the response 118 to the CPU 102 such that the CPU 102 is informed of the completion of the requested action on the data 122.

As discussed above, tags may be maintained for each of the capabilities in the memory 120. The tags may be associated with physical memory locations, e.g., physical addresses, of the memory 120 instead of virtual addresses. By associating the tags to physical addresses, the same physical memory mapped at multiple points in the address space or in different address spaces may have the same tags. According to examples, the CPU 102 may operate in the virtual address space and the capability enforcement controller 110 may operate in the physical address space. In this regard, the capability enforcement controller 110 may not be able to identify the physical address of the data 122 from a virtual address of the data 122. As shown in FIG. 1B, the CPU 102 may include functions 130 to map virtual addresses to physical addresses of the memory 120. The functions 130, which may be machine readable instructions, hardware logic blocks, or a combination thereof, may map virtual address locations of data 122 to the physical address locations of the data 122 on the memory 120. The CPU 102 may also transfer the mapped physical address location of the data 122 in the instruction 114 communicated to the capability enforcement controller 110.

According to examples, the capability enforcement controller 110 may handle exception cases that occur across boundaries between the CPU 102 and the capability enforcement controller 110 boundaries. For instance, the capability enforcement controller 110 may handle exceptions by propagating an occurrence of a memory failure as an exception to the CPU 102. This may be non-trivial because the context in which capability invocation or access was conducted may have long passed by and there may be a need to detect that context (e.g., process, thread, object invocation) and attach the context to an exception that is being returned from the capability processing functions 112 in the capability enforcement controller 110. According to examples, this may be accomplished by object oriented programming techniques where each invocation attempts to catch the exception that will be asynchronously returned from the capability enforcement controller 110. In other examples, sufficient state may be passed to and from the capability enforcement controller 110 to enable the CPU 102 to identify the correct context and to return the correct context to the CPU 102 in case of an exception. Similarly a thread identifier may be passed or a capability may be returned, which would indicate an access violation or invocation.

According to examples, areas in the memory 120 that the capability enforcement controller 110 covers may be encapsulated from the areas in the memory 120 that the capability enforcement controller 110 does not cover. In other words, the capability enforcement controller 110 may handle exceptions differently for different cases. For instance, an application-specific programmatic manner may be implemented to encapsulate the covered areas. In addition, applications may be aware of which objects are allocated from which area in the memory 120, such as DRAM or fabric attached memory (e.g., global or persistent memory).

Figure 2:
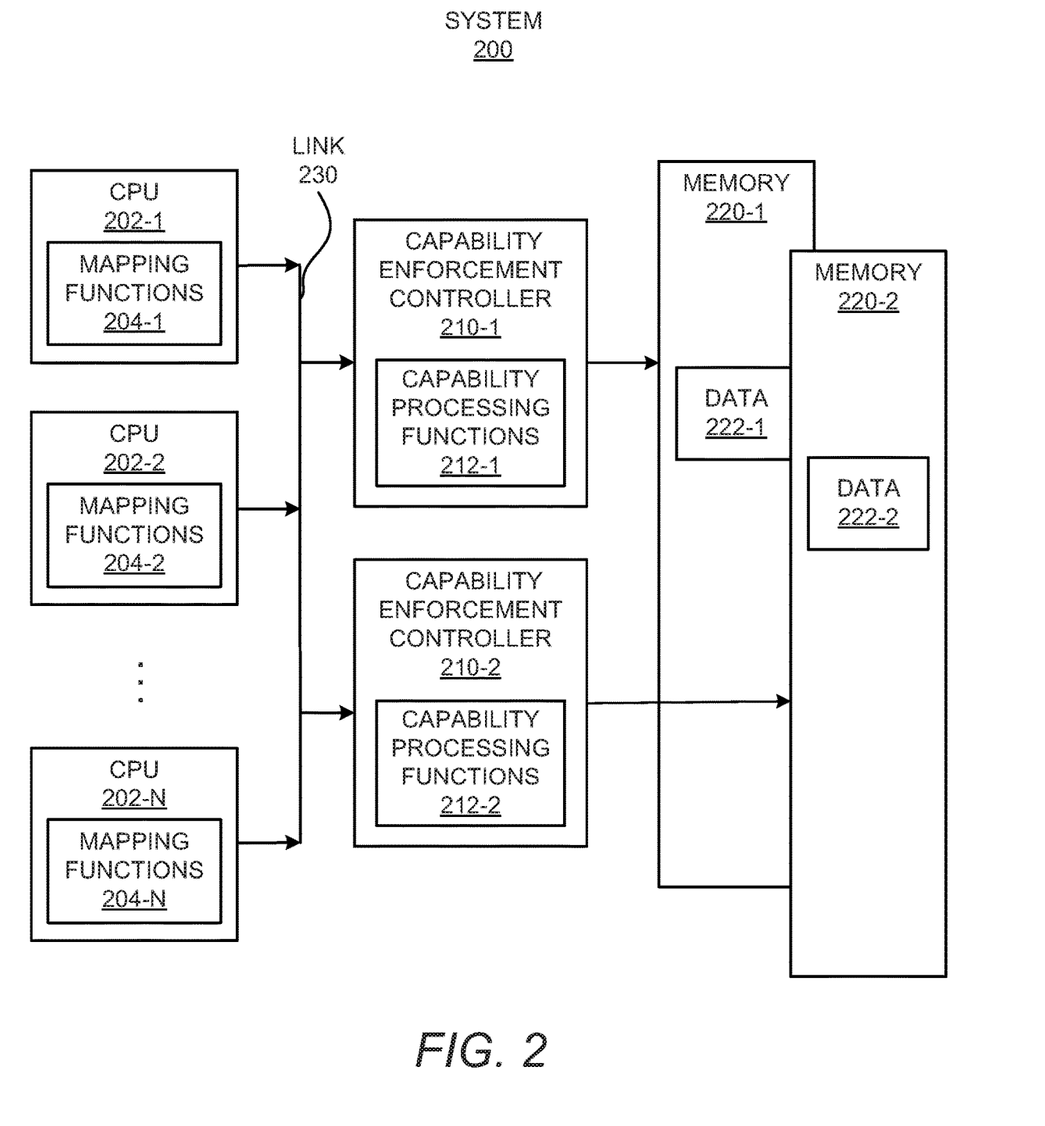
FIG. 2 shows a block diagram of another example system that may include capability enforcement controllers that enforce capabilities covering physical address in multiple memories.

Turning now to FIG. 2, there is shown a block diagram of another example system 200 that may include capability enforcement controllers to enforce capabilities covering physical locations in multiple memories. It should be understood that the example system 200 depicted in FIG. 2 may include additional features and that some of the features described herein may be removed and/or modified without departing from the scope of the system 200.

As shown in FIG. 2, the system 200 may include a plurality of CPUs 202-1 to 202-N, in which "N" may represent an integer greater than one. Each of the CPUs 202-1 to 202-N may also include mapping functions 204-1 to 204-N, which may be equivalent to the functions 130 discussed above with respect to FIGS. 1A and 1B. In one regard, each of the CPUs 202-1 to 202-N may function in similar manners to the CPU 102 discussed above with respect to FIGS. 1A and 1B.

The system 200 may also include a first capability enforcement controller 210-1 and a second capability enforcement controller 210-2. The first capability enforcement controller 210-1 may include first capability processing functions 212-1 and the second capability enforcement controller 210-2 may include second capability processing functions 212-2. The capability enforcement controller 210-1 and the second capability enforcement controller 210-2 may function in similar manners to those discussed above with respect to the capability enforcement controller 110 shown in FIGS. 1A and 1B.

The system 200 may further include a first memory 220-1 and a second memory 220-2. The first memory 220-1 may include a first range of physical addresses, e.g., 0xff0000000000 to 0xffffffffffff, and the second memory 220-2 may include a second range of physical addresses, e.g., 0x100000000000 to 0x1ffffffffff. The first memory 220-1 may have stored thereon a first data 222-1 at a first particular physical address and the second memory 220-2 may have stored thereon a second data 222-2 at a second particular physical address. According to examples, the first capability enforcement controller 210-1 may implement the capability processing functions 212-1 to protect access to the first data 222-1 stored on the first memory 220-1. In addition, the second capability enforcement controller 210-2 may implement the capability processing functions 212-2 to protect access to the second data 222-2 stored on the second memory 220-2.

As shown in FIG. 2, the CPUs 202-1 to 202-N may be linked to each of the capability enforcement controllers 210-1 and 210-2 via a link 230. The link 230 may be an interconnect and/or other type of connection, e.g., a connection across a fabric. In some examples, the CPUs 202-1 to 202-N may be contained on a common IC chip, while in other examples, the CPUs 202-1 to 202-N may be contained on separate IC chips. In the latter examples, the CPUs 202-1 to 202-N may be housed in separate machines, e.g., computers, servers, or the like. In any regard, the CPUs 202-1 to 202-N may access the first data 222-1 via communication with the first capability enforcement controller 210-1 and may access the second data 222-2 via communication with the second capability enforcement controller 210-2.

According to examples, the mapping functions 204-1 to 204-N in the CPUs 202-1 to 202-N may map the physical addresses of the data 222-1 and 222-2 to the same virtual addresses. That is, globally shared memory may be mapped to the same virtual memory addresses for all of the CPUs 202-1 to 202-N (e.g., nodes). This may effectively aggregate the memories 220-1 and 220-2 to a large shared memory pool with all of the same virtual and all of the same physical addresses on all of the CPUs 202-1 to 202-N and for all processes. In other examples, capabilities may point only relatively within a single unit of the global memory, e.g., similar to fat pointers, where the combination of segment address (unit of global memory) and capability address results in an ultimate physical address. This may, however, complicate the capabilities pointing across the units of global memory and may require more complex relative addressing that combines unit address and capability address or cross pointing (from one capability to another capability), etc. In yet other examples, every capability sent from a CPU 202-1 to the capability enforcement controllers 210-1 and 210-2 may contain both the virtual address and the physical address of a location at which certain data is stored. In these examples, the capability enforcement controllers 210-1 and 210-2 may use the virtual address to communicate with the CPUs 202-1 to 202-N and the physical address to access the certain data.

In any regard, prior to issuing an instruction to access the first data 222-1, a mapping function 204-1 N may identify the virtual address of the first data 222-1 and may map the identified virtual address to the physical address of the first data 222-1. The instruction issued to the first capability enforcement controller 210-1 may include the physical address of the first data 222-1. The first capability enforcement 210-1 may implement the first capability processing functions 212-1 to determine whether the CPU 202-1 that issued the instruction is permitted to access the physical address of the first data 222-1 in manners as discussed above with respect to the capability processing functions 112. In addition, the first capability enforcement controller 210-1 may perform the requested action on the first data 222-1 if the CPU 202-1 is permitted to access the physical address of the first data 222-1 or may drop the request if the CPU 202-1 is not permitted to access the physical address of the first data 222-1. The first capability enforcement controller 210-1 may also report the results of any actions taken on the first data 222-1 to the CPU 202-1.

The CPUs 202-1 to 202-N may issue similar instructions to the second capability enforcement controller 210-2 when attempting to access the second data 222-2. In addition, the second capability enforcement controller 210-2 may function in similar manners to the first capability enforcement controller 210-1 in response to receipt of an instruction to access the second data 222-2 stored on the second memory 220-2.

It should be understood that FIG. 2 has been depicted as including two capability enforcement controllers 210-1 and 210-2 and memories 220-1 and 220-2 for purposes of illustration and that the system 200 may include any number of capability enforcement controllers and memories without departing from a scope of the system 200. In addition, it should be understood that additional capability enforcement controllers and memories may function in similar manners as those discussed above with respect to the first and second capability enforcement controllers 210-1 and 210-2 and the first and second memories 220-1 and 220-2.

Figure 3:
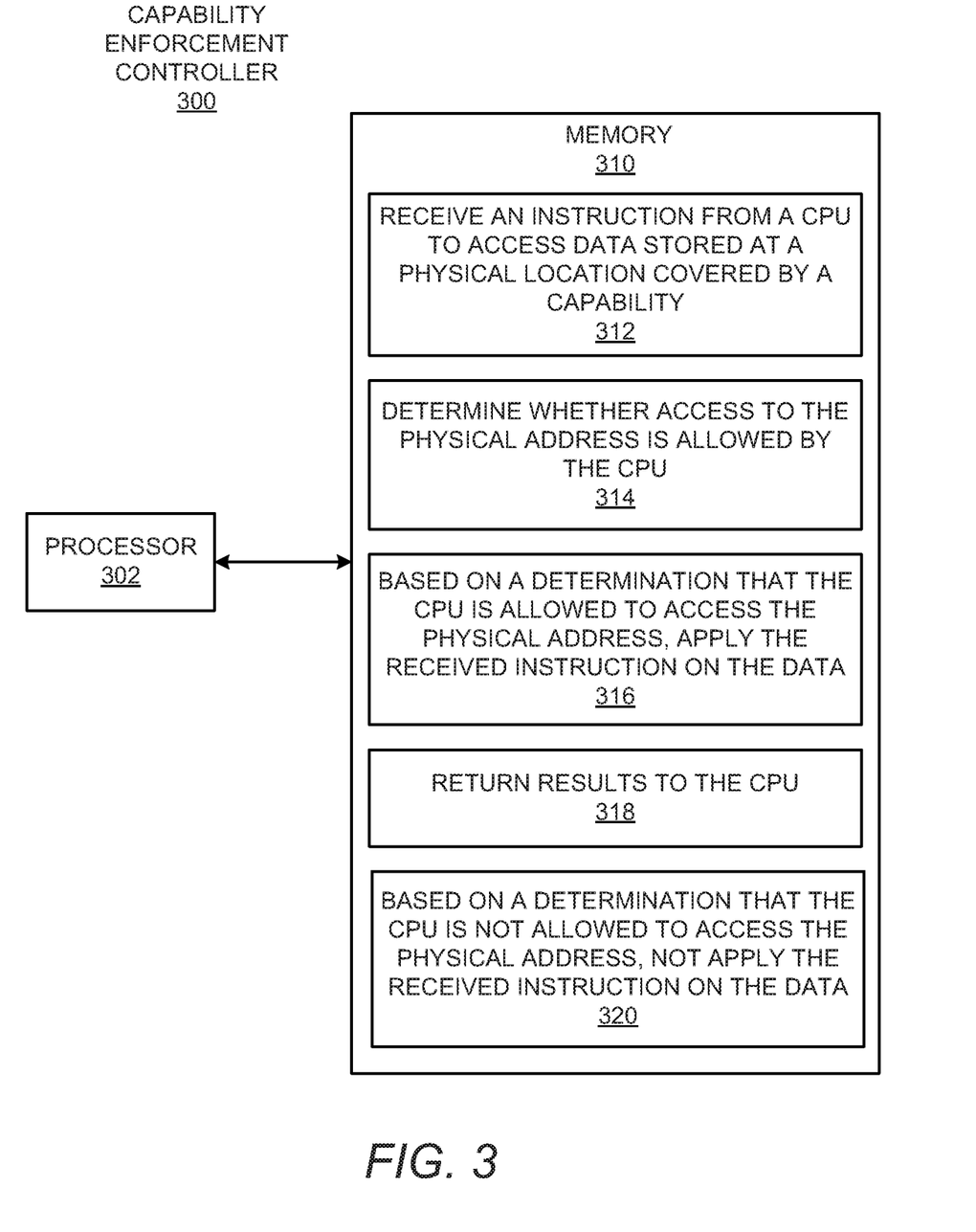
FIG. 3 shows a block diagram of an example capability enforcement controller.

Turning now to FIG. 3, there is shown a block diagram of an example capability enforcement controller 300. It should be understood that the example capability enforcement controller 300 depicted in FIG. 3 may include additional features and that some of the features described herein may be removed and/or modified without departing from the scope of the capability enforcement controller 300.

Generally speaking, the capability enforcement controller 300 may be equivalent to any of the capability enforcement controllers 102, 210-1, and 210-2 discussed herein with respect to FIGS. 1A, 1B, and 2. Thus, it should be understood that the description of the capability enforcement controller 300 may be applicable to the capability enforcement controllers 102, 210-1, and 210-2 discussed herein and vice versa. As shown in FIG. 3, the capability enforcement controller 300 may include a processor 302 that may control operations of the capability enforcement controller 300. The processor 302 may be a semiconductor-based microprocessor, a central processing unit (CPU), an application specific integrated circuit (ASIC), a field-programmable gate array (FPGA), and/or other suitable hardware device.

The capability enforcement controller 300 may also include a memory 310 that may have stored therein machine readable instructions 312-320 (which may also be termed computer readable instructions) that the processor 302 may execute. The memory 310 may be an electronic, magnetic, optical, or other physical storage device that contains or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The processor 302 may fetch, decode, and execute the instructions 312 to receive an instruction from a CPU 102 to access data 122 stored on a physical address in a memory 120, in which the physical address is covered by a capability. The instruction from the CPU 102 may include an identification of the physical address. The processor 302 may fetch, decode, and execute the instructions 314 to determine whether access to the physical address of the memory 120 is allowed by the CPU 102. The processor 302 may fetch, decode, and execute the instructions 316 to, based on a determination that the CPU 102 is allowed to access the physical address of the memory 120, apply the received instruction on the data 122. The processor 302 may fetch, decode, and execute the instructions 318 to return results of the applied instruction on the data 122. The processor 302 may fetch, decode, and execute the instructions 320 to, based on a determination that the CPU 102 is not allowed to access the physical address of the memory 120, not apply the received instruction on the data 122.

In other examples, instead of the memory 310, the capability enforcement controller 300 may include hardware logic blocks that may perform functions similar to the instructions 312-314. In yet other examples, the capability enforcement controller 300 may include a combination of instructions and hardware logic blocks to implement or execute functions corresponding to the instructions 312-314. In any of these examples, the processor 302 may implement the hardware logic blocks and/or execute the instructions 312-314. Moreover, the processor 302 may implement the hardware logic blocks and/or execute the instructions 312-314 on instructions received from other CPUs 202-1 to 202-N.

Figure 4:
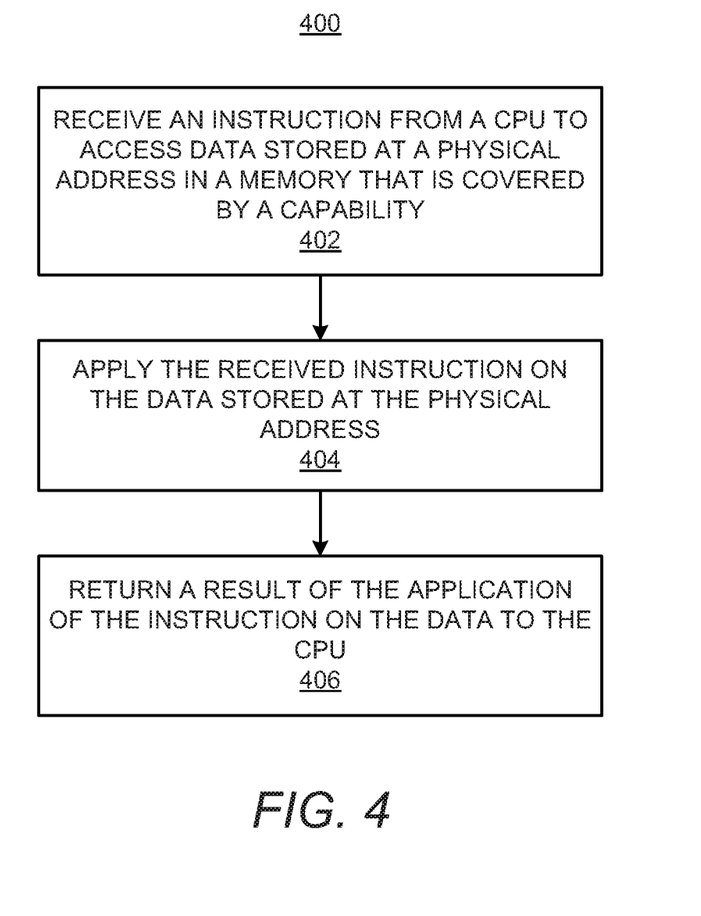
FIG. 4 depicts a flow diagram of an example method for implementing a capability enforcement controller.

Various manners in which the capability enforcement controller 300 may operate are discussed in greater detail with respect to the method 400 depicted in FIG. 4. Particularly, FIG. 4 depicts a flow diagram of an example method 400 for implementing a capability enforcement controller 300. It should be understood that the method 400 depicted in FIG. 4 may include additional operations and that some of the operations described therein may be removed and/or modified without departing from scope of the method 400. The description of the method 400 is made with reference to the features depicted in FIGS. 1A-3 for purposes of illustration.

At block 402, the capability enforcement controller 300 may receive an instruction from a CPU 102 to access data 122 stored at a physical address in a memory 120, in which the physical address is covered by a capability. The capability may be an unforgeable token of authority that protects access to the physical address of the memory 120 at which the data 122 is stored. As discussed herein, the capability enforcement controller 300 may be a separate hardware component from the CPU 102 and may thus be outside of the CPU 102.

At block 404, the capability enforcement controller 300 may apply the received instruction on the data 122 stored at the physical address of the memory 120. According to examples, prior to applying the received instruction on the data 122, the capability enforcement controller 300 may determine whether the CPU 102 is authorized to access the physical address. The capability enforcement controller 300 may make this determination in any of the manners discussed above with respect to the capability for the controller 110 depicted in FIGS. 1A and 1B. In these examples, the capability enforcement controller 300 may apply the received instruction on the data 122 in response to a determination that the CPU 102 is authorized to access the physical address. However, based on a determination that the CPU 102 is not authorized to access the physical address, the capability enforcement controller 110 may not apply the received instruction on the data 122.

At block 406, the capability enforcement controller 300 may return a result of the application of the instruction on the data 122 to the CPU 102. For instance, the capability enforcement controller 300 may return an indication that the requested action has been performed on the data 122. In other instances in which the requested action was not performed on the data 122 because the CPU 102 was not authorized to access the data 122, the capability enforcement controller 300 may return an indication that the requested action was not performed.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A system comprising:
   a capability-agnostic central processing unit (CPU) lacking awareness of capability-specific functionality within the system; and
   a capability enforcement controller in communication with the capability-agnostic CPU and disposed between the capability-agnostic CPU and a memory,
      wherein the capability-agnostic CPU and the capability enforcement processor are connected using an interconnect fabric,
      wherein the capability enforcement controller implements capability processing functions that control capabilities,
      wherein the capabilities are unforgeable tokens of authority that protect access by the capability-agnostic CPU to data stored at a physical address stored in the memory, the capability enforcement controller being separate from the capability-agnostic CPU,
      wherein the capability-agnostic CPU is to map a virtual address of the data to the physical address of the memory at which the data is stored and to communicate an instruction to access the mapped physical address of the memory at which the data is stored to the capability enforcement controller,
      wherein content of the instruction includes a virtual address space pointer, the mapped physical address, and a capability,
      wherein the instruction is transmitted from the capability-agnostic CPU to the capability enforcement controller,
      wherein the capability enforcement controller is to, based on receipt of the instruction, directly access the data stored at the mapped physical address of the memory,
      wherein the capability enforcement controller stores a capability register file including one or more rights for the capability-agnostic CPU, the one or more rights defining a set of capability-protected locations in the memory accessible by the capability-agnostic CPU, and
      wherein each capability-protected location in the memory includes a bit identifying the capability-protected location as protected by the capability.

2. The system of claim 1, wherein the capability enforcement controller is to receive an instruction to access the data stored in the memory from the capability-agnostic CPU, to access the data stored in the memory based on a determination that the capability-agnostic CPU is permitted to access the data, and to return results of the accessed data to the capability-agnostic CPU.

3. The system of claim 2, wherein the capability enforcement controller is to determine whether the capability-agnostic CPU is permitted to access the physical address of the memory identified in the instruction.

4. The system of claim 1, further comprising:
a second capability-agnostic CPU, wherein the capability enforcement controller is separate from the second capability-agnostic CPU and is to protect access by the second capability-agnostic CPU to a physical address at which the data is stored on the memory.

5. The system of claim 4, wherein the capability enforcement controller is to protect access to data stored in a first range of physical addresses, the system further comprising:
a second capability enforcement controller to protect access to data stored in a second range of physical addresses, wherein the capability-agnostic CPU and the second capability-agnostic CPU are to access data stored in the first range of physical addresses through the capability enforcement controller and to access data stored in the second range of physical addresses through the second capability enforcement controller.

6. The system of claim 4, wherein the capability-agnostic CPU and the second capability-agnostic CPU each map common virtual addresses to the same physical addresses of the memory.

7. The system of claim 1, wherein the capability-agnostic CPU and the capability enforcement controller handle exceptions that occur across boundaries between the capability-agnostic CPU and the capability enforcement controller.

8. The system of claim 1, wherein areas of the memory that are covered by the capability enforcement controller are encapsulated from those areas of the memory that are not covered by the capability enforcement controller.

9. The system of claim 1, wherein the capability enforcement processor issues a direct programming instruction of the capability enforcement controller through memory mapped registers, and wherein the direct programming instruction is communicated on the interconnect fabric.

10. A method comprising:
receiving, by a capability enforcement controller, an instruction from a capability-agnostic central processing unit (CPU) to access data stored at a physical address in a memory, the physical address being covered by a capability,
wherein the capability-agnostic CPU and the capability enforcement processor are connected using an interconnect fabric,
wherein the capability is an unforgeable token of authority that protects access to the physical address at which the data is stored,
wherein content of the instruction includes a virtual address space pointer, the physical address, and the capability, and
wherein the capability enforcement controller is outside of the capability-agnostic CPU and disposed between the CPU and the memory, the capability-agnostic CPU lacking awareness of capability-specific functionality within the system;
applying directly, by the capability enforcement controller, the received instruction on the data stored at the physical address; and
returning, by the capability enforcement controller, a result of the application of the instruction on the data to the capability-agnostic CPU,
wherein the capability enforcement controller stores a capability register file including one or more rights for the capability-agnostic CPU, the one or more rights defining a set of capability-protected locations in the memory accessible by the capability-agnostic CPU, and
wherein each capability-protected location in the memory includes a bit identifying the capability-protected location as protected by the capability.

11. The method of claim 10, further comprising:
determining whether the capability-agnostic CPU is authorized to access the physical address, wherein applying the received instruction on the data further comprises applying the received instruction based on a determination that the capability-agnostic CPU is authorized to access the physical address.

12. The method of claim 11, further comprising:
based on a determination that the capability-agnostic CPU is not authorized to access the physical address, not applying the received instruction on the data stored at the physical address.

13. The method of claim 10, wherein the received instruction from the capability-agnostic CPU includes an identification of the physical address of the memory.

14. The method of claim 10, wherein the received instruction from the capability-agnostic CPU includes an identification of a virtual address of the data, the method further comprising:
determining the physical address of the memory at which the data is stored from a mapping of the virtual address and the physical address.

15. The method of claim 10, further comprising:
receiving, by the capability enforcement controller, a second instruction from a second capability-agnostic CPU to access second data stored at a second physical address, the second physical address being covered by a second capability, the second capability being an unforgeable token of authority that protects access to the second data, and wherein the capability enforcement controller is external to the second capability-agnostic CPU;
determining whether the second capability-agnostic CPU is authorized to access the second physical address;
applying the received second instruction on the second data based on a determination that the second capability-agnostic CPU is authorized to access the second physical address; and
returning a result of the application of the second instruction on the second data to the second capability-agnostic CPU.

16. The method of claim 15, wherein the received second instruction from the second capability-agnostic CPU includes an identification of the second physical address.

17. A capability enforcement controller comprising:
a processor; and
a memory on which are stored machine readable instructions that when executed by the processor cause the processor to:
receive an instruction from a capability-agnostic central processing unit (CPU) that is external to the capability enforcement controller to access data stored at a physical address in a memory, the physical address being covered by a capability, wherein the capability-agnostic CPU and the capability enforcement processor are connected using an interconnect fabric, wherein the capability is an unforgeable token of authority that protects access to data stored at the physical address, the capability enforcement controller disposed between the capability-agnostic CPU and the memory, the capability-agnostic CPU lacking awareness of capability-specific functionality within a system, wherein content of the instruction includes a virtual address space pointer, the mapped physical address, and the capability;

determine whether the capability-agnostic CPU is allowed to access the physical address;

based on a determination that the capability-agnostic CPU is allowed to access the physical address, directly apply the received instruction on the data stored at the physical address; and return results of the application of the instruction on the data to the capability-agnostic CPU, wherein the capability enforcement controller stores a capability register file including one or more rights for the capability-agnostic CPU, the one or more rights defining a set of capability-protected locations in the memory accessible by the capability-agnostic CPU, and wherein each capability-protected location in the memory includes a bit identifying the capability-protected location as protected by the capability.

18. The capability enforcement controller of claim 17, wherein the instructions are further to cause the processor to:

based on a determination that the capability-agnostic CPU is not allowed to access the physical address, not apply the received instruction on the data stored at the physical address.

19. The capability enforcement controller of claim 17, wherein the instructions are further to cause the processor to:

receive a second instruction from a second capability-agnostic CPU that is external to the capability enforcement controller to access second data stored at a second physical address, the second physical address being covered by a second capability, and the second capability being an unforgeable token of authority that protects access to the second data;

determine whether the second capability-agnostic CPU is allowed to access the second physical address;

apply the received second instruction on the second data based on a determination that the second capability-agnostic CPU is allowed to access the second physical address; and return a result of the application of the second instruction on the second data to the second capability-agnostic CPU.

20. The capability enforcement controller of claim 17, wherein the instructions are further to cause the processor to:

receive an identification of the physical address with the instruction from the capability-agnostic CPU.

* * * * *